United States Patent Office 3,817,912
Patented June 18, 1974

3,817,912
NONFLAMMABLE MOLDING COMPOSITIONS OF STYRENE POLYMERS
Klaus Diebel and Helmut Birkner, Marl, West Germany, assignors to Chemische Werke Huls Aktiengesellschaft
No Drawing. Filed Dec. 29, 1971, Ser. No. 213,738
Claims priority, application Germany, Dec. 31, 1970, P 20 64 677.9
Int. Cl. C09k 3/28
U.S. Cl. 260—45.7 R                    15 Claims

ABSTRACT OF THE DISCLOSURE

Improved nonflammable polystyrene molding compositions containing 1–20% of a brominated polyalkylbenzene of the formula

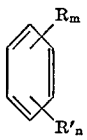

wherein R is bromomethyl or dibromomethyl; $m$ is an integer from 2 to 4, inclusive; R' is alkyl of 1–3 carbon atoms, bromine or chlorine, at least one R' being ortho to each R; and $n$ is an integer from 1 to 4, inclusive.

BACKGROUND OF THE INVENTION

This invention relates to nonflammable thermoplastic polystyrene molding compositions.

Self-extinguishing and/or nonflammable molding compositions are utilized to an increasing extent in many fields of application, predominantly in the construction, electrical and automotive industries. It is known to employ halogen-containing substances as flame retardants for thermoplastic synthetic resins, and that organic bromine compounds are significantly more effective than comparable chlorine-containing compounds. See Thater, "Brennverhalten von Plastformstoffen" (1968); Vogel, "Flammfestmachen von Kunststoffen" (1966).

German Published Application DAS 1,201,544 describes flameproof molding compositions which have been rendered flameproof by the addition of 25–40% by weight of chlorinated hexamethylbenzenes, based on the polymer composition, in mixture with oxygen compounds or sulfur compounds of an element of Main Group V of the Periodic Table. However, additives of this order of magnitude have a detrimental effect on the mechanical properties of the basic polymers. In Canadian Pat. 558,230, nonflammable polystyrenes are described wherein 3–10% by weight of low-substituted bromination products of alkyl benzenes of 8–10 carbon atoms, e.g., 1,2-di(dibromomethyl)benzene is utilized. However, the aforementioned compounds are too unstable chemically and thermally, so that they cannot be used at the usual, high processing temperatures of 200–250° C. in injection molding machines or extruders.

Also, for the same reasons, $\omega$, $\omega$, $\omega'$, $\omega'$-tetrabromoxylene and the analogous compounds bromine-substituted in the methyl group, such as, for example, $\omega,\omega'$-dibromoxylene and $\omega,\omega,\omega',\omega',\omega'$-hexabromoxylene, which are described in German Published Application DOS 1,468,852 as flame-retarding components for expandable types of polystyrene compositions, are unsuitable as flame retardants in the production of molded articles in injection molding machines or extruders at conventional processing temperatures.

In U.S. 3,635,850 and German Patent Application P 17 94 182.1–43, bromination products of hexamethylbenzene are proposed as flame retardants for styrene polymers, which products can be employed, if desired, together with organic chlorine compounds and antimony trioxide. The bromination of hexamethylbenzene at a higher temperature results, in correspondence with the amount of bromine utilized, in mixtures of substances containing compounds with 1–6 bromomethyl groups in the molecule. However, these bromination mixtures also contain, in addition to effective compounds, substances of little or no effectiveness, so that they must be employed in relatively large amounts to ensure efficient flameproofness, thereby unfavorably altering the good mechanical properties of the basic polymers. The removal of the compounds of low effectiveness from the bromination mixture cannot be accomplished technically or only at considerable expense. Nevertheless, it is desirable to employ flame retardants in quantities as low as possible.

It has now been found that nonflammable molding compositions from styrene polymers, which do not exhibit these disadvantages, can be obtained by providing that the styrene polymers contain brominated polyalkylbenzenes as defined hereinafter.

SUMMARY OF THE INVENTION

The novel nonflammable polystyrene molding compositions of this invention contain 1–20%, based on the styrene polymer, of a brominated polyalkylbenzene of the general Formula I

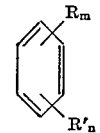   I wherein R is bromomethyl or dibromomethyl; $m$ is an integer from 2 to 4, inclusive; R' is alkyl of 1–3 carbon atoms, bromine or chlorine, at least one R' being ortho to each R; and $n$ is an integer from 1 to 4, inclusive.

DETAILED DISCUSSION

The brominated polyalkyl benzenes utilized in the compositions of this invention contain at least 2 bromomethyl or dibromomethyl groups and, in the ortho-position with respect to each of these bromomethyl groups, at least one of alkyl of 1–3 carbon atoms, bromine or chlorine. Particularly suitable are those compounds of Formula I which exhibit a decomposition point of at least 200° C.

The following classes of brominated polyalkylbenzenes are examples of those falling within the scope of the compounds of Formula I, above:

(a)
1,2-diR-3,6-diR'-benzene,
1,2-diR-3,4,6-triR'-benzene, and
1,2-diR-3,4,5,6-tetraR'-benzene;

(b)
1,3-diR-2-R'-benzene,
1,3-diR-4,6-diR'-benzene,
1,3-diR-2,6-diR'-benzene,
1,3-diR-2,4,6-triR'-benzene, and
1,3-diR-2,4,5,6-tetraR'-benzene;

(c)
1,4-diR-3,6-diR'-benzene,
1,4-diR-2,3-diR'-benzene,
1,4-diR-2,3,5-triR'-benzene, and
1,4-diR-2,3,5,6-tetra-R'-benzene;

(d)
1,2,4-triR-3,6-diR'-benzene, and
1,2,4-triR-3,5,6-triR'-benzene;

(e)

1,3,5-triR-2,4-diR'-benzene,
1,3,5-triR-2,6-diR'-benzene, and
1,3,5-triR-2,4,6-triR'-benzene;

(f)

1,2,4,5-tetraR-3,6-diR'-benzene.

As seen from these classes of polyalkylbrominated benzenes, each R group (BrCH$_2$ or Br$_2$CH) has at least one R' group (alkyl of 1-3 C, Br or Cl) ortho thereto.

Specific examples of such brominated polyalkylbenzenes are 1,2,4,5-tetrakis(bromomethyl)-3,6-dibromobenzene;
1,2,4,5-tetrakis(bromomethyl)-3,6-dichlorobenzene;
1,3,5-tris(bromomethyl)-2,4,6-tribromobenzene;
1,3,5-tris(bromomethyl)-2,4,6-trichlorobenzene;
1,3,5-tris(bromomethyl)-2,4,6-trimethylbenzene;
1,4-bis(bromomethyl)-2,3,5,6-tetramethylbenzene;
1,4-bis(dibromomethyl)-2,5-dibromobenzene;
1,4-bis(bromomethyl)-2,5-dibromobenzene;
1,4-bis(bromomethyl)2,5-dimethyl-3,6-dibromobenzene;
1,4-bis(bromomethyl)-2,5-dimethylbenzene;
1,4-bis(bromomethyl)-2,5-diethylbenzene;
1,3-bis(bromomethyl)-4,6-dimethylbenzene;
1,3-bis(bromomethyl)-4,6-diethylbenzene;
1,3-bis(bromomethyl)-2,4,5-trimethylbenzene;
1,2,4-tris(bromomethyl)-3,5,6-trimethylbenzene;
1,3-bis(bromomethyl)-2-methyl-5-tert.-butyl-benzene;
1,3-bis(bromomethyl)-2-ethyl-5-tert.-butylbenzene;
1,3-bis(bromomethyl)-2-methyl-4-tert.-butylbenzene;
3,5-bis(bromomethyl)-4-methylcumene;
1,4-bis-(dibromomethyl)-2,5-dichlorobenzene;
1,4-bis-(dibromomethyl)-2,3,5,6-tetrabromobenzene;
1,2,4,5-tetrakis-(dibromomethyl)-3,6-dibromobenzene;
1,2,4,5-tetrakis-(dibromomethyl)-3,6-dichlorobenzene;
1,3,5-tris-(dibromomethyl)-2,4,6-tribromobenzene.

Of the compounds of this invention, particularly suitable are those wherein (a) R is CH$_2$Br;
(b) R' is CH$_3$ or Br;
(c) R is CH$_2$Br and $n$ is 2 or 3;
(d) R is CH$_2$Br and R' is CH$_3$ or Br;
(e) R is CH$_2$Br, R' is CH$_3$ or Br and $m$ is 2 or 3;
(f) R is CH$_2$Br, R' is CH$_3$ or Br and $n$ is 2 or 3; and
(g) R is CHBr$_2$, R' is Br and $n$ is 2.

The polyalkylbrominated benzenes of Formula I can be obtained in accordance with conventional methods, viz., (a) Nuclear halogenation of the corresponding polyalkyl benzenes in a suitable solvent, e.g., at room temperature, and subsequent side-chain bromination at a higher temperature, optionally under UV irradiation, the intermediate products being isolated or the production of the found reaction product is effected in a single operating step;

(b) Bromomethylation of corresponding polyalkyl benzenes;

(c) Bromomethylation of corresponding polyalkyl benzenes and subsequent nuclear halogenation, e.g., at benzenes and subsequent nuclear halogenation, e.g., at a temperature of between 20 and 50° C. in a suitable solvent.

Especially suitable starting materials for the production of the bromine compounds are durene, pseudocumene, mestiylene, the xylenes and the diethylbenzenes.

The brominated alkyl benzenes are employed in the novel polystyrene molding compositions in amounts of from 1-20% by weight, preferably 4-10% by weight, based on the styrene polymer, the exact amount being such that the molding compositions have a bromine content of at least 0.5% by weight. They can be employed individually or in a mixture of two or more compounds of Formula I. In addition to the brominated alkyl benzenes of Formula I, optionally the molding compositions can also contain one or more of chlorine compounds, antimony compounds, borates of alkaline earth metals or metals of Subgroup II of the Periodic Table of the Elements.

When employing chlorine compositions in the novel compositions of this invention, it is advantageous to employ those having a high chlorine content, in order to keep the quantities of chlorine compounds in the synthetic resin composition as low as possible. Suitable chlorine compounds are, for example, chlorinated paraffins of at least 15 carbon atoms, preferably 25-40 carbon atoms or chlorinated polyethylenes. The proportion of antimony compounds, e.g., antimony trioxide, should be kept as low as possible. In general, amounts of 1-2% by weight are sufficient, based on the styrene polymer. Suitable borates are, for example, zinc borate and barium metaborate. The molding compositions can contain, in addition to the flame-retardant additives, other customary additives, e.g., one or more of stabilizers, lubricants, fillers, coloring agents and plasticizers.

Examples of styrene polymers employed in the novel compositions of this invention are polystyrene, poly-α-methylstyrene, copolymers of styrene or α-methylstyrene and another monomer, e.g., acrylonitrile and esters of acrylic or methacrylic acid, containing at least 50% styrene or α-methylstyrene incorporated therein by polymerization. Impact-resistant styrene polymers containing elastomeric components and the so-called ABS (acrylonitrile-butadiene-styrene) polymers can also be employed. Impact-resistant styrene polymers can be obtained by mixing the styrene polymers with the elastomeric components or by grafting the styrene, optionally in a mixture with polymerizable monomers, onto the elastomeric component. It is, of course, also possible to employ mixtures of impact-resistant styrene polymers.

The molding compositions provided with the flame retardants of the present invention are especially suitable for the production of compact materials by extrusion or injection molding methods. In order to produce the self-extinguishing molding compositions, the bromine compounds can be added prior to, during, or after the polymerization of the styrene composition. However, advantageously, they are subsequently incorporated into the styrene polymer, optionally together with the chlorine-containing additives and/or antimony trioxide and/or the borates of the alkaline earth metals or transition metals or, individually in succession, on a rolling mill, in the extruder or in a masticator.

The molding compositions of this invention can also be added to styrene polymers containing expanding agents. Suitable expanding agents are hydrocarbons or halogenated hydrocarbons which are gaseous or liquid under ambient conditions, which do not dissolve the styrene polymer, and the boiling points of which are below the softening point of the polymer, e.g., propane, butane, pentane, hexane, cyclohexane, dichlorodifluoromethane, and trifluorochloromethane. The blowing agents can be employed in the expandable molding compositions in amounts of 2-15% by weight, based on the styrene polymer.

The bromine compounds are, under storage conditions, entirely resistant to hydrolysis and odorless, and, under processing conditions, sufficiently thermally stable so that they are not yet degraded into corrosive fragments, as in the case of conventional bromoalkyl compounds.

The self-extinguishing effect of the additives in the molding compositions can be evaluated in accordance with the following test:

Vertically suspended testing pieces (strips 100 x 10 x 1 mm.; strips 100 x 10 x 2 mm.; sheet 100 x 100 x 2 mm.) are subjected at their lower edges to a small, non-luminous Bunsen burner flame (flame length approximately 2 cm.) until they begin to burn. After removal of the flame, the after-burning time is determined in each case.

At least 5 ignition tests are conducted on each specimen. The afterburning times of the specimens which were in each case ignited five times were utilized as data. These data constitute a satisfactory criterion of the extent to which the polystyrene composition has been rendered flame-retardant.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

100 Parts by weight of an impact-resistant polystyrene containing 8.5% by weight of a butadiene-styrene copolymer and 4.5% by weight of paraffin oil, 5 parts by weight of 1,2,4,5-tetrakis (bromomethyl)-3,6-dibromobenzene, 2 parts by weight of chlorinated paraffin (70% chlorine) and 2 parts by weight of antimony trioxide are mixed together, homogenized on a roll and comminuted. From the resulting granules, pressed plates are produced and the test specimens are cut therefrom. The afterburning times of the strip of a thickness of 2 mm. are, in the burning test, 1–1–2–2–1–2 seconds. Admixing 7 parts instead of 5 parts by weight of 1,2,4,5-tetrakis(bromomethyl)-3,6-dibromobenzene does not appreciably alter the afterburning times.

COMPARATIVE EXAMPLES

Adding, instead of 5 parts by weight of 1,2,4,5-tetrakis (bromomethyl)-3,6-dibromobenzene, 8 parts by weight of a bromination product of hexamethylbenzene containing an average of 5.5 bromine atoms per molecule to the impact-resistant polystyrene of Example 1, afterburning times of 8–7–9–6–5 seconds are obtained.

An attempt to produce self-extinguishing test specimens from impact-resistant polystyrene by admixing thereto 1,2-bis(dibromomethyl)benzene, 1,4-bis(dibromomethyl)benzene or 1,4-bis(bromomethyl)benzene, failed because the bromine compounds decomposed at the processing temperatures and inflicted noticeable damage on the processing machines.

EXAMPLE 2

100 Parts by weight of an impact-resistant polystyrene with 8.5% by weight butadiene and 4.5% by weight of paraffin oil content, 7 parts by weight of 1,4-bis(dibromomethyl)-2,5-dibromobenzene, 2 parts by weight of chlorinated paraffin (70% chlorine) and 2 parts by weight of antimony trioxide are homogenized on a roll and pressed into sheets. The afterburning times of a strip of 2 mm. thickness are 2–2–2–1–2 seconds.

EXAMPLES 3–10

100 Parts by weight of the impact-resistant polystyrene employed in Example 2, 2 parts by weight of chlorinated paraffin (70% chlorine), 2 parts by weight of antimony trioxide and the parts by weight of various bromine compounds set forth in Table 1 are pressed into sheets as described in the preceding examples. The afterburning times are measured on a 100 x 10 x 1 mm. strip and a 100 x 100 x 2 mm. sheet.

EXAMPLE 11

100 Parts by weight of an impact-resistant polystyrene and 10 parts by weight of 1,3,5-tris(bromomethyl)-2,4,6-trimethylbenzene are processed into a strip of 1 mm. thickness as described in Example 1. The afterburning times are 2–3–3–3–3 seconds.

In case of a strip thickness of 2 mm., the afterburning times are 3–5–4–2–3 seconds.

When using, instead of 10 parts by weight of 1,3,5-tris (bromomethyl)-2,4,6-trimethylbenezne, only 5 parts by weight thereof, together with 2 parts by weight of antimony trioxide, in 100 parts by weight of an impact-resistant polystyrene, the afterburning times for a strip 1 mm. thick are 8–8–10–3–6 seconds.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a nonflammable thermoplastic polystyrene molding composition containing 1–20%, based on the styrene polymer, of at least one brominated polyalkyl benzene, the improvement wherein the brominated polyalkyl benzene is a compound of the formula $$\underset{R'_n}{\overset{R_m}{\bigcirc}}$$

wherein R is bromomethyl or dibromomethyl; $m$ is an integer from 2 to 4, inclusive; R' is bromine or chlorine, at least one R' being ortho to each R and $n$ is an integer from 1 to 4.

2. A composition according to Claim 1 containing 4–10% by weight, based on the styrene polymer of the brominated polyalkylbenzene.

3. A molding composition according to Claim 1 wherein the brominated polyalkyl benzene compound has a decomposition point of at least 200° C.

4. A composition according to Claim 1 wherein R is $CH_2Br$.

5. A composition of Claim 1 wherein R' is Br.

6. A composition according to Claim 1 wherein R is $CH_2Br$ and $n$ is 2 or 3.

7. A composition according to Claim 1 wherein R is $CH_2Br$ and R' is Br.

8. A composition according to Claim 1 wherein R is $CH_2Br$, R' is Br and $m$ is 2 or 3.

9. A composition according to Claim 1 wherein R' is Br and $n$ is 2 or 3.

10. A composition according to Claim 2 wherein the brominated polyalkyl benzene compound has a decompo-

TABLE 1

| Example number | | Parts by weight | Br content of mixture (percent) | Afterburning times (sec.) | |
|---|---|---|---|---|---|
| | | | | Strip | Sheet |
| 3 | 1,4-bis(bromomethyl)-2,5-dimethylbenzene | 10 | 4.8 | 1–2–2–1–1 | 1–2–1–2–3 |
| 4 | 1,3,5-tris(bromomethyl)-2,4,6-tribromobenzene | 10 | 7.9 | 2–3–5–2–14 | 1–2–2–5 |
| 5 | 1,4-bis(bromomethyl)-2,3,5,6-tetramethylbenzene | 8 | 3.6 | 2–1–2–2–3 | 1–2–1–2–2 |
| 6 | 1,2,4,5-tetrakis(bromomethyl)-3,6-dibromobenzene | 7 | 5.0 | 2–2–2–2–2 | 2–2–3–3–5 |
| 7 | do | 5 | 2.7 | 3–2–1–3–3 | 2–2–2–1–1 |
| 8 | 1,4-bis(dibromomethyl)-2,5-di-bromobenzene | 7 | 5.2 | 2–2–1–2–2 | 2–1–3–5–4 |
| 9 | do | 5 | 3.7 | 2–2–2–1–2 | 2–4–2–7–20 |
| 10 | 1,3,5-tris(bromomethyl)-2,4,6-tri-methylbenzene | 6 | 3.3 | 3–2–1–1–2 | 1–2–1–1–2 | sition point of at least 200° C., wherein R is $CH_2Br$ and R' is Br.

11. A composition according to Claim 10 wherein $n$ is 2 or 3.

12. A composition according to Claim 11 wherein the brominated polyalkylbenzene is 1,2,4,5-tetrakis(bromomethyl)-3,6-dibromobenzene.

13. A composition according to Claim 1 wherein the brominated polyalkylbenzene is 1,3,5-tris(bromomethyl)-2,4,6-tribromobenzene.

14. A composition according to Claim 1 wherein the brominated polyalkylbenzene is 1,2,4-tris(bromomethyl)-3,5,6-tribromobenzene.

15. A composition according to Claim 1 wherein the brominated polyalkylbenzene is 1,4-bis(dibromomethyl)-2,5-dibromobenzene.

References Cited

UNITED STATES PATENTS

| | | | |
|---|---|---|---|
| 3,331,797 | 7/1967 | Kopetz et al. | 260—28.5 |
| 3,551,360 | 12/1970 | Dressler | 260—2.5 |
| 3,658,634 | 4/1972 | Yanagi et al. | 161—175 |
| 2,028,715 | 1/1936 | Hanson | 252—8.1 |
| 2,631,168 | 3/1953 | Ross et al. | 260—618 |
| 2,676,927 | 4/1954 | McCurdy et al. | 260—2.5 |
| 3,058,926 | 10/1962 | Eichhorn | 260—2.5 |
| 3,168,580 | 2/1965 | Adams | 260—651 |
| 3,372,141 | 3/1968 | Dickerson et al. | 260—45.95 |
| 3,396,201 | 8/1968 | Weil et al. | 260—648 |
| 3,419,626 | 12/1968 | Pyne et al. | 260—651 |
| 3,420,786 | 1/1969 | Weber et al. | 260—2.5 |
| 3,635,850 | 1/1972 | Birkner et al. | 260—2.5 |

OTHER REFERENCES

Hopff et al.: Chemical Abstracts, vol. 56, 1962, 399e.

DONALD E. CZAJA, Primary Examiner

R. A. WHITE, Assistant Examiner

U.S. Cl. X.R.

260—2.5 FP, 28.5 A, 28.5 B, 45.75 B, 45.75 R, 892